United States Patent [19]

Brulet et al.

[11] Patent Number: 4,948,872

[45] Date of Patent: Aug. 14, 1990

[54] PROCESS FOR SPRAY DRYING OF VINYL CHLORIDE HOMOPOLYMERS AND COPOLYMERS

[75] Inventors: Daniel Brulet, Saint-Symphorien D'ozon; Yves Pommier, Saint-Auban, both of France

[73] Assignee: Atochem, Paris la Defense, France

[21] Appl. No.: 91,271

[22] Filed: Aug. 31, 1987

[30] Foreign Application Priority Data

Sep. 12, 1986 [FR] France .................................. 86 12781

[51] Int. Cl.$^5$ .............................................. C08F 6/14
[52] U.S. Cl. ..................................... 528/499; 528/502; 528/503
[58] Field of Search ................. 528/500, 502, 499, 503

[56] References Cited

U.S. PATENT DOCUMENTS

| | | | |
|---|---|---|---|
| 4,133,947 | 1/1979 | Kalka | 528/502 |
| 4,229,249 | 10/1980 | Felsvang et al. | 528/501 |
| 4,283,526 | 8/1981 | Chandra | 528/500 |
| 4,389,522 | 6/1983 | Boeke | 528/503 |
| 4,539,396 | 9/1985 | Yasui | 528/481 |

OTHER PUBLICATIONS

Chemical Abstracts, vol. 101, No. 16, Oct. 15, 1984, p. 31, No. 101:131551g; W. A. Roberson et al.

*Primary Examiner*—Christopher Henderson
*Attorney, Agent, or Firm*—Sigalos, Levine & Montgomery

[57] ABSTRACT

A process for the preparation of vinyl chloride homopolymer and copolymer pulverulent powders suitable for the preparation of plastisols with improved rheological properties, comprising polymerizing to form a vinyl chloride homopolymer or copolymer latex and drying said latex by atomization, the temperature at which the latex to be subjected to drying by atomization is employed being at least equal to 40° C. and being lower than the degradation temperature of said homopolymer or copolymer, and the resultant vinyl chloride polymer pulverulent powders.

3 Claims, No Drawings

PROCESS FOR SPRAY DRYING OF VINYL CHLORIDE HOMOPOLYMERS AND COPOLYMERS

BACKGROUND OF THE INVENTION

The object of the present invention is a process for the preparation of vinyl chloride homopolymers and copolymers in the form of a powder suitable for yielding platisols with improved rheological properties. The vinyl chloride homopolymers and copolymers prepared are also the object of the invention.

It is known that for certain applications in which the vinyl chloride polymers are used in the form of plastisols such as, for example, coating, it is necessary to use polymers in the form of a powder suitable for yielding plastisols which, in the presence of very low amount of plasticizer; as low as 25 parts by weight of plasticizer per 100 parts by weight of polymer, present the lowest possible viscosity both at low rate gradient and high rate gradient.

Vinyl chloride homopolymers and copolymers suitable for yielding plastisols are prepared by homopolymerization of the vinyl chloride in emulsion or in micorsuspension, or copolymerization of the vinyl chloride in emulsion or in microsuspension with another copolymerizable monomer. This homopolymerization or copolymerization industrially provides a latex generally containing 30 to 60% by weight of dry material formed by vinyl chloride homopolymer or copolymer particles having a diameter generally between 0.1 to 5μm. To obtain a dry pulverulent polymer, the said latex, possibly following concentration, for example, by ultrafiltration, is generally treated by drying, especially by drying by atomization.

The drying of the said latices by atomization is a well-known technique which is carried out in an apparatus consisting of an atomization device fed with the latex and an atomization chamber in which the said device continuously disperses the latex in fine droplets. In this device, hot gases, generally air, come into contact with the pulverized mass and evaporate the water present in each droplet. The temperature of the gases entering the atomization chamber is generally between 170° and 260° C., and their temperature upon leaving the chamber is between 65° and 80° C. From the latex particles, polymer agglomerates having a diameter generally between 30 and 150μm are thus continuously formed, separated from the hot gases and then finally subjected to, also continuously, to grinding intended to lead to sizes generally between 5 and 30μm. The grinding can especially be carried out by means of a device using mechanical energy or compressed air to precipitate the agglomerates against a solid wall and/or against one another, thus reducing their size.

According to the processes currently used, especially for reasons pertaining to the homogeneity of the polymer to be prepared, the vinyl chloride homopolymer and copolymer latices produced according to successive polymerization operations are mixed in a storage tank where they are kept at ambient temperature and, at this ambient temperature, they are subjected to the treatment of drying by atomization.

The resultant pulverulent powders do not produce plastisols having the desired rheological properties and still contain undesired levels of vinyl chloride monomer in the polymer.

SUMMARY OF THE INVENTION

The present invention overcomes the problems of the prior art and provides pulverulent vinyl chloride polymers suitable for the preparation of plastisols with improved rheological properties and also the residual amount of vinyl chloride monomer in the powder is greatly diminished.

Briefly, the present invention comprises a process of the preparation of vinyl chloride homopolymer and copolymer pulverulent powder suitable for the preparation of plastisols comprising drying a vinyl chloride homopolymer or copolymer latex by atomization, the temperature at which the latex to be subjected to atomization is employed being at least equal to about 40° C. and being lower than the degradation temperature of said homopolymer or copolymer.

The invention also comprises the resultant pulverulent vinyl chloride polymers.

The processing temperature of latex can be reached, continuously or discontinuously, by any suitable means, primarily by heating with low pressure steam (generally between 5 and 20 bars) in direct contact with the latex, or by heating with a heat exchanger, using a circulation fluid such as water, for example. In a particularly advantageous embodiment of the process of the invention, the treating of the latex comprises heating with microwaves to reach the operating temperature of the latex In another particularly advantageous embodiment of the process of the invention, the operating temperature of the latex is reached by heating by passing an electric current, preferably an alternating current, through the latex.

DETAILED DESCRIPTION

Vinyl chloride "polymers" as defined herein are homopolymers and copolymers, the latter containing at least 50% by weight of vinyl chloride and at least one monomer which is copolymerizable with vinyl chloride. Copolymerizable monomers are those generally used in the standard techniques of the copolymerization of vinyl chloride. Examples are the vinyl esters of mono- and polycarboxylic acids such as vinyl acetate, vinyl propionate and vinyl benzoate; unsaturated mono- and polycarboxylic acids such as acrylic, methacrylic, maleic, fumaric, itaconic and their aliphatic, cycloaliphatic and aromatic esters, their amides and their nitriles; allyl, vinyl, and vinylidene halides; alkyl vinyl ethers; and olefins.

The latex to be treated can be prepared by any process for the homopolymerization or copolymerization of vinyl chloride in emulsion or in microsuspension, possibly in the presence of one or several seeding products. The latex may be primarily prepared by the homopolymerization or copolymerization of vinyl chloride in seeded emulsion according to the process described in French Pat. Application No. 74.32094, published under No. 2,286,152. It may be primarily prepared by the homopolymerization or copolymerization of vinyl chloride in seeded microsuspension according to the process described in French Patent Application No. 75.13582, Published under No. 2,309,569. It can also be prepared by mixing several latices prepared by any method for homopolymerization or copolymerization of vinyl chloride in emulsion or in microsuspension. The latex to be treated or, in the case of a latex mixture, each of the latices in the mixture, may be submitted to concentration before treatment, for example, by ultrafiltration.

The latex to be treated generally contains 0 to 80% by weight of dry material, consisting of vinyl chloride homopolymer and copolymer particles having a diameter generally between 0.1 and 5μm.

If the latex to be treated is obtained from polymerization at a temperature at least equal to 40° C., the drying operation by atomization, if desired, may be carried out directly on the latex, before it temperature drops below 40° C.

The vinyl chloride polymers, the object of the invention, are appropriate for the production of sheets, films, molds, cellular materials, products molded by calendering, extrusion, extrusion-blowing and injection techniques, as well as the manufacture of applied coatings and products molded by any techniques used to process plastisols and organosols such as coating, rotation molding, dipping and spraying.

The invention will be further described in connection with the following examples which are given for purposes of illustration only.

Examples 1 and 13 are given for the purpose of comparison only.

Examples 2 through 12 and 14 through 24 are according to the invention. They demonstrate that vinyl chloride polymers obtained by the atomization drying treatment of the latex processed at a temperature according to the invention present an amount of residual vinyl chloride monomer much lower than that found in polymers prepared by the atomization drying treatment of the same latex processed at a temperature other than that indicated by the present invention. They also show that the vinyl chloride polymers obtained by the atomization drying treatment of the latex processed at a temperature according to the invention lead to plastisols having low gradient viscosity and high gradient viscosity rates which are lower or at most equal to that of plastisols obtained, all other things are being equal, from polymers prepared by the atomization drying treatment of the same latex processed at a temperature other than that indicated by the invention.

The drying operation of the latices by atomization is carried out in an apparatus which is industrially known by the name of NIRO, consisting of an atomization device with a 150-mm diameter turbine rotating at 18,000 rpm, placed at the top of an atomization chamber having a capacity of 45 m³, which is fed by hot air. The temperature of the air entering the atomization chamber is 180° C., and its temperature upon leaving the chamber is 70° C. The flow rate of the latices, in terms of dry material, is 100 kg/hour.

The polymer agglomerates formed during the atomization drying operation are subjected to a grinding operation in a mill which is industrially known by the name of MIKROPUL ACM 10, provided with a milling plate with spindles rotating at 4,800 rpm and an air selector consisting of 24 blades having a height of 60 mm and rotating at 3,000 rpm. The air flow rate is 26 kg/minute and the polymer flow rate is 350 kg/hour.

Following grinding, a plastisol is prepared by mixing 100 parts by weight of polymer and 40 parts by weight of dioctylphthalate. The rheological properties of the plastisol are determined:

(i) on the one hand, by means of a rotation-type Brookfield RVT rheometer (conditioning and measurement at 25° C.; NO. 7 needle rotating at 20 rpm), and (ii) on the other hand, by means of an extrusion-type Severs rheometer (conditioning two hours at 25° C. and measurement at 25° C.).

EXAMPLES 1 THROUGH 12

Preparation of the Latex

A vinyl chloride homopolymer latex is prepared in a 1,000-liter capacity autoclave provided with a double jacket for the circulation of fluid according to the process described by French Patent Application No. 75.13582, published under No. 2,309,569. Thus, after being placed under vacuum, the autoclave is loaded with:

(i) 255 kg of deionized water;
(ii) 400 kg of vinyl chloride;
(iii) 65 kg of a polyvinyl chloride seeding latex with 31.5 % by weight of dry material, initially prepared in microsuspension, whose particles have an average diameter of 0.507μm and contain 1.92% by weight of lauroyl peroxide with respect to the polymer;
(iv) 23 kg of a polyvinyl chloride seeding latex with 43.5% by weight of dry material, initially prepared in emulsion, whose particles have an average diameter of 0.130 μm and do not contain lauroyl peroxide;
(v) 2.8 kg of sodium dodecylbenzene sulfonate; and
(vi) 15 g of copper sulfate, $CuSO_4 \cdot 5H_2O$.

While stirring, the reaction mixture is heated at 52° C. under autogenous pressure, and this temperature is maintained for the duration of the polymerization operation. As soon as the temperature reaches 52° C., an aqueous solution of 0.57 g/liter ascorbic acid at the rate of 2 liter/hour is continuously added until the end of the polymerization operation. After 13.5 hours of polymerization and degassing of the unreacted vinyl chloride, a latex containing two populations of particles having different sizes and dry material weight of 52% is obtained. The population of large particles and the population of fine particles have the respective average diameters of 1.10 m and 0.20μm, and they represent 82% and 18% by weight, respectively.

Part of the latex is transferred into a storage tank where its temperature drops to 25° C.

EXAMPLES 13 THROUGH 24

Preparation of the Latex

A vinyl chloride homopolymer latex is prepared in a 1,000-liter capacity autoclave provided with a double jacket for the circulation of fluid according to the process described in French Patent No. 74.32094, published under No. 2,286,152. Thus, after putting under vacuum, the autoclave is loaded with:

(i) 310 kg of deionized water;
(ii) 400 kg of vinyl chloride;
(iii) 133 g of soda;
(iv) 400 g of lauric acid,
(v) 28 kg of a polyvinyl chloride seeding latex with 40% by weight of dry material, initially prepared in emulsion in the presence of sodium lauryl sulfate, whose particles have an
average diameter of 0.30μm; and
(vi) 100 g of ammonium persulfate.

While stirring, the reaction mixture is heated at 52° C. under autogenous pressure, and this temperature is maintained for the duration of the polymerization operation. After one hour of polymerization, one continuously adds, until the amount of heat removed per unit of time from the reaction medium by the fluid circulating through the double jacket reaches its maximum value, an aqueous solution of sodium metabisulfite at the rate of 4 g/hour, and over eight hours, one adds an aqueous solution of 15% by weight of sodium dodecylbenzene sulfonate. After 11.5 hours of polymerization and degassing of the untreated vinyl chloride, a latex consisting of two populations of particles having different sizes and a dry material weight of 50% is obtained. The population of large particles and the population of fine particles have the respective average diameters of 0.85μm and 0.20/μm, and they represent 75% and 25% by weight, respectively.

Part of the latex is transferred into a storage tank where its temperature drops to 25° C.

According to Examples 1 and 13, a fraction of the corresponding latex taken from the storage tank is subjected to the drying operation by atomization without changing its temperature beforehand.

According to Examples 2 through 11 and 14 through 23, a fraction of the corresponding latex taken from the storage tank is subjected to the drying operation by atomization after being continuously heated at a higher temperature.

According to Examples 2, 3, 14 and 15, the heating of the latex is carried out by direct injection of low pressure steam (16 bars) into the said latex during its transfer from the storage tank to the atomization apparatus. The injection of steam is carried out by means of an apparatus consisting of a pipe having the shape of a truncated cone with end diameters equal to 10 and 20 cm, respectively, through which the latex flows in the direction of the increasing section, the length and the walls of which are provided with steam outlets.

According to Examples 4, 5, 16 and 17, the heating of the latex is carried out by passing the said latex through a tubular heat exchanger supplied with hot water as the circulating fluid.

According to Examples 6, 7, 8, 18, 19 and 20, the heating of the latex is carried out by heating the said latex by microwaves during its transfer from the storage tank to the atomization apparatus. Heating is carried out by means of five microwave devices industrially known by the name of MMP12 generators and marketed by the SAIREM Company, connected in series by 20 mm diameter polytetrafluoroethylene pipe through which the latex passes.

According to Examples 9, 10, 11, 21, 22 and 23, the heating of the latex is carried out by passing an electric current through the said latex during its transfer from the storage tank to the atomization apparatus. Heating is carried out by means of an alternating electric current having a frequency of 50 Hertz, the voltage of which is applied between the internal and external elements of a cylindrical stainless-steel pipe, whose transit section has the shape of a circular crown having an internal diameter of 65 mm and an external diameter of 84 mm, through which the latex passes. The voltage is regulated between 110 and 220 volts depending on the latex to be treated, its flow rate and the temperature increase desired.

According to Examples 12 and 24, a fraction of the corresponding latex taken directly from the autoclave is subjected to the drying operation by atomization without changing its temperature beforehand.

Tables I and II below set forth, respectively, for Examples 1 through 12 and for Examples 13 through 24:
  (i) the processing temperature of the latex to be subjected to the drying operation by atomization;
  (ii) the amount of residual vinyl chloride monomer determined in the polymer obtained after grinding; and
  (iii) the rheological properties of the plastisols obtained.

TABLE I

| Ex. | Processing temp. of the latex (°C.) | Amt. of residual vinyl chloride monomer (mg/kg) | Brookfield RVT Rheometer | | Severs Rheometer | |
|---|---|---|---|---|---|---|
| | | | Duration of conditioning (hours) | Viscosity (Pa · s) | Rate gradient (s$^{-1}$) | Viscosity (Pa · s) |
| 1 | 25 | 19 | 0.5 | 20 | 642 | 35.4 |
| | | | 24 | 40 | | |
| 2 | 42 | 10 | 0.5 | 16 | 642 | 35.4 |
| | | | 24 | 34.5 | | |
| 3 | 60 | 3.2 | 0.5 | 14 | 660 | 34.5 |
| | | | 24 | 30 | | |
| 4 | 42 | 8.6 | 0.5 | 17 | 642 | 35.4 |
| | | | 24 | 35 | | |
| 5 | 60 | 3 | 0.5 | 13.5 | 642 | 35.4 |
| | | | 24 | 29 | | |
| 6 | 42 | 9.5 | 0.5 | 17 | 642 | 35.4 |
| | | | 24 | 35.5 | | |
| 7 | 60 | 2.5 | 0.5 | 13 | 660 | 33.6 |
| | | | 24 | 28 | | |
| 8 | 80 | 0.8 | 0.5 | 11 | 675 | 34.5 |
| | | | 24 | 18 | | |
| 9 | 42 | 10.3 | 0.5 | 18 | 642 | 35.4 |
| | | | 24 | 36 | | |
| 10 | 60 | 2.9 | 0.5 | 15 | 660 | 34.5 |
| | | | 24 | 32 | | |
| 11 | 80 | 0.9 | 0.5 | 12 | 670 | 34.0 |
| | | | 24 | 31 | | |
| 12 | 52 | 6.4 | 0.5 | 15 | 649 | 35.0 |
| | | | 24 | 32 | | |

TABLE II

| Ex. | Processing temp. of the latex (°C.) | Amt. of residual vinyl chloride monomer (mg/kg) | Brookfield RVT Rheometer | | Severs Rheometer | |
|---|---|---|---|---|---|---|
| | | | Duration of conditioning (hours) | Viscosity (Pa · s) | Rate gradient (s⁻¹) | Viscosity (Pa · s) |
| 13 | 25 | 15 | 0.5 | 29 | 422 | 53.8 |
| | | | 24 | 54 | | |
| 14 | 42 | 3.6 | 0.5 | 22 | 422 | 53.8 |
| | | | 24 | 42 | | |
| 15 | 60 | 1.2 | 0.5 | 20.5 | 439 | 51.8 |
| | | | 24 | 38 | | |
| 16 | 42 | 4.8 | 0.5 | 22 | 422 | 53.8 |
| | | | 24 | 43 | | |
| 17 | 60 | 1.1 | 0.5 | 20.5 | 422 | 53.8 |
| | | | 24 | 39.5 | | |
| 18 | 42 | 5.2 | 0.5 | 21.5 | 439 | 51.8 |
| | | | 24 | 43.5 | | |
| 19 | 60 | 1.0 | 0.5 | 20 | 439 | 51.8 |
| | | | 24 | 40.5 | | |
| 20 | 80 | 0.5 | 0.5 | 14.5 | 473 | 48.0 |
| | | | 24 | 22 | | |
| 21 | 42 | 4.4 | 0.5 | 23 | 422 | 53.8 |
| | | | 24 | 44 | | |
| 22 | 60 | 1.1 | 0.5 | 21 | 434 | 51.8 |
| | | | 24 | 40 | | |
| 23 | 80 | 0.6 | 0.5 | 16 | 445 | 51.0 |
| | | | 24 | 24 | | |
| 24 | 52 | 2.2 | 0.5 | 21 | 429 | 53.0 |
| | | | 24 | 30 | | |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for the preparation of vinyl chloride homopolymer and copolymer pulverulent powders suitable for the preparation of plastisols with improved rheological properties, comprising polymerizing to form a vinyl chloride homopolymers or copolymer latex and drying all of said latex by atomization to form pulverulent powders, the temperature of the latex to be subjected to drying by atomization at the initiation of atomization being at least equal to 40° C. to a temperature lower than the degradation temperature of said homopolymer or copolymer.

2. The process of claim 1, wherein the latex is heated to said temperature by means of low pressure steam in direct contact with the latex, by means of a heat exchanger using circulating fluid, by heating by microwaves, by passing an electric current through said latex.

3. The process of claim 1, wherein after polymerization at a temperature at least equal to 40° C., the drying by atomization of the latex is carried out directly on the said latex before its temperature drops below 40° C.

* * * * *

UNITED STATES PATENT AND TRADEMARK OFFICE
CERTIFICATE OF CORRECTION

PATENT NO. : 4,948,872
DATED : August 14, 1990
INVENTOR(S) : BRULET, et al

It is certified that error appears in the above-identified patent and that said Letters Patent is hereby corrected as shown below:

Column 7, line 41, correct "homopolymers" to read -- homopolymer --.

Signed and Sealed this

Twentieth Day of August, 1991

Attest:

HARRY F. MANBECK, JR.

Attesting Officer

Commissioner of Patents and Trademarks